(12) United States Patent
Cover et al.

(10) Patent No.: US 7,849,695 B1
(45) Date of Patent: Dec. 14, 2010

(54) ROCKET THRUSTER COMPRISING LOAD-BALANCED PINTLE VALVE

(75) Inventors: Cary L. Cover, Warwick, MD (US); Albert S. Drendel, Elkton, MD (US)

(73) Assignee: Alliant Techsystems Inc., Edina, MN (US)

( * ) Notice: Subject to any disclaimer, the term of this patent is extended or adjusted under 35 U.S.C. 154(b) by 3608 days.

(21) Appl. No.: 09/954,126

(22) Filed: Sep. 17, 2001

(51) Int. Cl.
*F02K 1/08* (2006.01)

(52) U.S. Cl. .......................................... 60/771; 60/242
(58) Field of Classification Search .................... 60/771, 60/242, 258; 137/109, 334
See application file for complete search history.

(56) References Cited

U.S. PATENT DOCUMENTS

| | | | |
|---|---|---|---|
| 2,552,497 A | 5/1951 | Roach et al. |
| 2,637,973 A | 5/1952 | Lawrence, Jr. |
| 2,814,929 A | 12/1957 | Morley et al. |
| 2,957,307 A | 10/1960 | Brandenberger et al. |
| 3,059,425 A | 10/1962 | McSherry et al. |
| 3,073,112 A | 1/1963 | Bleikamp, Jr. |
| 3,112,612 A | 12/1963 | Adamson et al. |
| 3,150,485 A | 9/1964 | Hickerson |
| 3,151,446 A | 10/1964 | Parilla |
| 3,156,091 A | 11/1964 | Kraus |
| 3,192,714 A | 7/1965 | Hickerson |
| 3,234,731 A | 2/1966 | Dermody et al. |
| 3,302,890 A | 2/1967 | Silver |
| 3,309,026 A | 3/1967 | Loprete |
| 3,319,423 A | 5/1967 | Caraher |
| 3,330,114 A | 7/1967 | McQueen |
| 3,427,698 A | 2/1969 | Guzewicz |
| 3,427,809 A | 2/1969 | Lavoie |
| 3,451,222 A | 6/1969 | Kelley |
| 3,504,860 A | 4/1970 | Wilson |
| 3,514,957 A | 6/1970 | Evans |

(Continued)

FOREIGN PATENT DOCUMENTS

DE          1 080 820       *  4/1960    .................. 60/258

OTHER PUBLICATIONS

Besnard, Eric, et al., Development and Flight-Testing of Liquid Propellant Aerospike Engines, AIAA/ASME/SAE/ASEE Joint Propulsion Conference, Jul. 11-14, 2004, Fort Lauderdale, Florida, AIAA-04-3354, pp. 1-10.

(Continued)

*Primary Examiner*—Stephen M Johnson
(74) *Attorney, Agent, or Firm*—TraskBritt

(57) ABSTRACT

A rocket thruster of this invention includes a nozzle and a valve assembly. The valve subassembly includes a pintle with a head portion, which has a truncated substantially conical surface region facing and concentric with converging and throat regions of the nozzle to provide a variable effective throat area therebetween. The truncated portion of the head portion has an outer edge defining a bleed passageway opening communicating with a primary bleed passage leading through the head portion to a bleed cavity located on an opposite side of the head portion. During activation of a rocket motor to which the rocket thruster is coupled, gases imparting a load on the head portion pass through the primary bleed passage to the opposite side of the head portion for counterbalancing loads acting on the head portion. A thrust control subassembly moves the pintle axially for changing the effective throat area.

55 Claims, 5 Drawing Sheets

U.S. PATENT DOCUMENTS

| | | | |
|---|---|---|---|
| 3,515,353 A * | 6/1970 | Young et al. | |
| 3,608,312 A | 9/1971 | Miltenberger | |
| 3,699,772 A | 10/1972 | Elverum, Jr. | |
| 3,710,574 A | 1/1973 | Pearson | |
| 3,712,063 A | 1/1973 | Andrysiak et al. | |
| 3,722,219 A | 3/1973 | Spencer | |
| 3,726,480 A | 4/1973 | Miltenberger | |
| 3,848,806 A | 11/1974 | Samuelsen et al. | |
| 3,871,173 A | 3/1975 | McKenna | |
| 3,897,008 A | 7/1975 | Dettling et al. | |
| 3,900,675 A | 8/1975 | Olcott | |
| 3,929,289 A | 12/1975 | Kardon et al. | |
| 3,940,067 A | 2/1976 | Cherry et al. | |
| 3,943,708 A | 3/1976 | Panella | |
| 3,948,042 A | 4/1976 | Beardsley et al. | |
| 3,972,479 A | 8/1976 | Calabrese et al. | |
| 4,244,294 A | 1/1981 | Frignac et al. | |
| 4,269,659 A | 5/1981 | Goldberg | |
| 4,478,040 A | 10/1984 | Johnson | |
| 4,498,395 A | 2/1985 | Kock et al. | |
| 4,760,694 A | 8/1988 | Gillon, Jr. | |
| 4,777,795 A | 10/1988 | Le Corre et al. | |
| 4,817,892 A | 4/1989 | Janeke | |
| 4,826,104 A | 5/1989 | Bennett et al. | |
| 5,154,352 A | 10/1992 | Buckreus | |
| 5,158,246 A | 10/1992 | Anderson, Jr. | |
| 5,394,690 A | 3/1995 | Arszman et al. | |
| 5,435,128 A | 7/1995 | Miskelly, Jr. et al. | |
| 5,456,425 A | 10/1995 | Morris et al. | |
| 5,491,973 A * | 2/1996 | Knapp et al. | 60/242 |
| 5,797,260 A * | 8/1998 | Koppel et al. | 60/247 |
| 5,826,794 A | 10/1998 | Rudolph | |
| 6,003,301 A | 12/1999 | Bratkovich et al. | |
| 6,164,060 A | 12/2000 | Myers et al. | |
| 6,170,257 B1 | 1/2001 | Harada et al. | |
| 6,213,431 B1 | 4/2001 | Janeke | |
| 6,220,852 B1 | 4/2001 | Moore | |
| 6,227,247 B1 | 5/2001 | Abel | |
| 6,233,919 B1 | 5/2001 | Abel et al. | |
| 6,276,125 B1 | 8/2001 | Tseng | |
| 6,293,091 B1 | 9/2001 | Seymour et al. | |
| 6,591,603 B2 | 7/2003 | Dressler et al. | |
| 6,629,416 B1 | 10/2003 | Johnson | |
| 6,651,438 B2 | 11/2003 | McGrath et al. | |
| 6,845,607 B2 | 1/2005 | Lair | |
| 6,964,154 B1 | 11/2005 | Sackheim et al. | |
| 6,986,246 B2 | 1/2006 | Fujita | |
| 7,155,898 B2 | 1/2007 | Sota, Jr. et al. | |
| 7,481,038 B2 | 1/2009 | Blozy et al. | |
| 7,509,796 B2 | 3/2009 | Hansen | |
| 7,565,797 B2 | 7/2009 | Nyberg et al. | |
| 2007/0163227 A1 | 7/2007 | Mano et al. | |

OTHER PUBLICATIONS

Burroughs, Susan, Status of Army Pintle Technology for Controllable Thrust Propulsion, 37th AIAA/ASME/SAE/ASEE Joint Propulsion Conference and Exhibit, Jul. 8-11, 2001, Salt Lake City, Utah, AIAA 2001-3598, pp. 1-8.

Hagemann, G, et al., Flow Phenomena in Advanced Rocket Nozzles—The Plug Nozzle, 34th AIAA/ASME/SAE/ASEE Joint Propulsion Conference & Exhibit, Jul. 13-15, 1998, Cleveland, Ohio, A98-35327, pp. 1-12.

Huzel, Dieter K., et al., Design of Liquid Propellant Rocket Engines, Second Edition, National Aeronautics and Space Administration, 1971, pp. 89-95.

Ostrander, M.J., et al., Printle Motor Challenges for Tactical Missiles, 36th AIAA/ASME/SAE/ASEE Joint Propulsion Conferences and Exhibit, Jul. 16-19, 2000, Huntsville, Alabama, AIAA 2000-3310, pp. 1-12.

Ito, Takashi, et al., Computations of the Axisymmetric Plug-Nozzle Flowfields: Flow Structures and Thrust Performance, Journal of Propulsion and Power, Mar.-Apr. 2002, pp. 254-260, vol. 18, No. 2.

Margraves, Chuck, Computer Simulation Helps Optimize Design of Innovative Rocket Motor, Journal Articles by Fluent Software Users, 2002, 3 pages, JA167.

Peck, Michael, Adjustable Rocket Motor Makes Tactical Missiles More Flexible, http://www.nationaldefensemagazine.org/issues/2004/Feb/Ajustable_Rocket.htm, Feb. 2004, 2 pages, National Defense Industrial Association.

Ruf, Joseph H., et al., Experimental Results for an Annular Aerospike Nozzle with Differential Throttling, 52nd JANNAF Propulsion Meeting/1st Liquid Propulsion Subcommittee Meeting, May, 2004, pp. 1-21.

Schaefer, R. L., et al., the Isentropic Spike Nozzle for Trajectory Control of Solid Propellant Rockets, Hercules Powder Company, 1960, pp. 203-225, 1960-5263L.

Sutton, George P., Nozzle Theory and Thermodynamic Relations, Rocket Propulsion Elements, an Introduction to the Engineering of Rockets, Sixth Edition, 1992, Chapter 3, Section 8, p. 82, John Wiley & Sons, Inc.

Sutton, George P., Liquid Propellant Rocket Engine Systems and Components, Rocket Propulsion Elements, an Introduction to the Engineering of Rockets, Sixth Edition, 1992, Chapter 10, Section 9, p. 359, John Wiley & Sons, Inc.

Sutton, George P., Solid Propellant Rocket Fundamentals, Rocket Propulsion Elements, an Introduction to the Engineering of Rockets, Sixth Edition, 1992, Chapter 11, Section 3, pp. 390-399, John Wiley & Sons, Inc.

Sutton, George P., Solid Propellant Rocket Fundamentals, Rocket Propulsion Elements, an Introduction to the Engineering of Rockets, Second Edition, 1958, Chapter 9, pp. 305-330 John Wiley & Sons, Inc.

Solid Rocket Motor Nozzles, 1975, National Aeronautics and Space Administration, NASA Space Vehicle Design Criteria (Chemical Propulsion) NASA SP-8115, 94 pages.

Advanced Propulsion for Tactical Missiles, NDIA Conference on Armaments for the Army Transformation, Jun. 2001, 28 pages.

* cited by examiner

ROCKET THRUSTER COMPRISING LOAD-BALANCED PINTLE VALVE

BACKGROUND OF THE INVENTION

1. Field of the Invention

This invention relates to the field of rockets and rocket thrusters, especially guided missiles equipped with divert and attitude rocket thrusters for controlling the flight path of the missiles.

2. Description of Related Art

Tactical aircraft, sea-skimming missiles, intercontinental ballistic missiles, theater missiles, and other tactical weapons are constantly being improved upon in their performance capabilities. As these tactical weapons become increasingly faster and evasive, highly maneuverable intercept missiles that are light in weight and have adequate range capability are required for targeting and successfully intercepting these tactical weapons.

The use of multiple stage rocket motors has long been known as an effective means for increasing propulsion efficiency in a missile system. In a multi-stage missile system, an upper stage carrying a payload sits atop one or more lower stage rocket motors. Usually, each rocket motor stage contains a case and a propellant or gas generant loaded in the case. The missile has a primary propulsion system that is typically initiated by igniting the lowest stage rocket motor. As the propellant or gas generant burns, the combustion products are rapidly expelled out the aft end of the motor to provide thrust to the missile. Upon burnout of the primary motor or at some other desired time, stage separation and thrust reduction of the separated stage may be effected. Stage separation includes detaching the lowest stage rocket motor from the remainder of the missile. Following detachment, the lowest rocket motor stage is physically isolated from contact with the upper stage. Separating the unneeded stage from the missile typically improves propulsion efficiency and maneuverability by reducing the mass of that subsequent rocket motor stages must propel. If the next higher stage contains a propellant or gas generant, that stage then becomes the operating lower rocket motor stage. The propellant of this new rocket motor lower stage may then be ignited to provide further propulsion to the missile. In this way, successive stages of rocket motors propel the payload toward its destination, with each stage being jettisoned as it is depleted of propellant or gas generant.

The guidance and control systems of missiles, especially those systems of the uppermost stage of a multi-stage rocket motor, possess enhanced missile guidance and control systems for improving their maneuverability and intercepting targets. The missile guidance and control system often contains radar or optics for detecting and pinpointing the location of a target. The missile guidance and control system takes this information and actuates thrust control systems for maneuvering to and successfully intercepting a target.

Because the lower and middle stages are often separated from the upper stage early in flight, the need for greater control and maneuverability over ballistic missiles is particularly prevalent at the upper stage of a ballistic missile. Oftentimes the trajectory of a ballistic missile must be corrected to insure accuracy in delivery of the payload or, in the case of multi-stage rocket weapons, precision final intercept maneuvering to counteract evasive movements of the target.

A highly maneuverable missile will typically include a thrust vector control (TVC) system, an axial thrust modulation control (TMC) system, and a roll control (RC) system, all interconnected and related.

The thrust vector control (TVC) systems rely on thrusters arranged radially or substantially radially relative to the main axis of the rocket motor for effecting sideways or "divert" movement to the missile. Thrust vector control systems have been developed using a variety of means, including movable or gimbaled nozzles, jet tabs, jet vanes and fluid injection into the nozzle. Typically, divert thrusters are provided in pairs of two or more, more commonly four or more, with each pair of thrusters diametrically opposed on opposite sides of the rocket motor case. Divert motors are perhaps most commonly arranged in a cruciform about the rocket motor axis, often at the axial center of gravity of the rocket motor. Actuation of divert thrusters allows missiles travelling at high speeds to be displaced sideways for enhancing intercept capabilities.

Usually, axial thrust modulation control is primarily attributed to a rear main thruster or a plurality of rear main thrusters arranged in a concentric pattern relative to the rocket motor axis. Axial thrust modulation control effectively manages and varies main axial nozzle thrust, thus controlling the velocity of the rocket.

Roll control systems typically comprise a pair or pairs of radial nozzles tangential to the rocket motor case. Selective actuation of the roll control thrusters may enhance stabilization of the rocket motor and facilitate imaging for guidance systems installed on the middle and upper stages of a rocket motor.

A single gas generant or propellant may feed all of the radial, tangential, and main thrusters of a rocket motor stage. Alternatively, for a given rocket motor stage, a main gas generant/propellant may be used for providing combustion products to the main thrust nozzles, and the radial and tangential thrusters may have a separate gas generant/propellant. In either case, pipes and valves couple the gas generator or solid propellant to the rocket thrusters. Independent and selective movement of the valves between open and closed positions controls the actuation and deactuation of the different thrusters or thruster pairs. By selectively controlling the amount of thrust or eliminating the thrust produced by the valves, axial thrust, divert movement, and roll are controlled during the flight for achieving precision maneuverability and enhancing the capability of the missile to intercept evasive targets.

Poppet valves have been used for selectively actuating and de-actuating rocket thrusters, and in particular divert thrusters. As referred to herein and understood in the art, a poppet valve is an on-off valve capable of movement to either a fully closed position or a single open position. An example of a poppet valve can be found in U.S. Pat. No. 3,330,114. A drawback to poppet valves, such as the one found in the aforementioned patent, is their incapability of being actuated to and retained at positions between the fully open and fully closed positions. That is, the poppet valve does not permit for proportional and continuously variable control over the effective throat area of a nozzle. Thus, controlling the amount of thrust generated by a poppet-valve thruster requires precision timing over the opening and closing movements of the poppet valve.

Another common valve found in thrusters is the pintle valve. Generally, a pintle valve is hydraulically, pneumatically, or electromechanically moved axially along the nozzle axis relative to the nozzle throat. As the pintle valve approaches the throat, the size of the throat passage is decreased, whereas movement of the pintle valve away from the throat increases the throat passage area. In this manner, thrust levels may be varied and controlled by axial movement of the pintle to a plurality of different axial positions. With some designs, the pintle valve provides flexibility by allowing for the possibility of continuously variable throat sizes.

However, the conventional pintle design has drawbacks. For example, the face of a pintle valve is subjected to a high load imparted by combustion products passing over the pintle valve and through the nozzle throat. In order to permit movement of pintle valves subjected to such loads, the pintle actuation mechanisms must have sufficient horsepower to overcome the load imparted to the pintle valve by the combustion products. In order to generate sufficient horsepower, the actuation mechanism often must be of a rather large size and heavy mass. However, the size and weight penalties contributed by large actuation mechanisms adversely affect the performance and maneuverability of the rocket motor.

OBJECTS OF THE INVENTION

It is an object of this invention to provide a rocket thruster comprising a pintle valve design that is movable into a plurality of different open positions for variably controlling the effective throat area, yet is capable of balancing the loads that combustion products impart on the pintle valve to obviate the need for large and heavy actuation mechanisms.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a rocket thruster assembly is provided. The rocket thruster assembly is designed for operatively coupling to a rocket motor to receive high temperature combustion products generated by the rocket motor upon ignition of propellant loaded in the rocket motor and to expel the combustion products for producing thrust.

In accordance with one preferred aspect of this invention, the rocket thruster assembly comprises, i.e., includes at least, a nozzle, a valve subassembly, and a thrust control subassembly. The nozzle comprises an internal passageway-defining surface structure which comprises a converging region that converges in cross section into a throat region, and a diverging region located aft of the throat region and extending radially outwardly. The converging and diverging regions and the throat region are coaxially aligned with each other. The valve subassembly comprises a pintle (also referred to herein as a pintle valve) with a head portion, the head portion having a truncated substantially conical surface region terminating at an aft end as a truncated portion that is preferably coaxial with the throat region. The truncated conical surface region faces and is preferably concentric with the converging region and the throat region to provide a variable effective throat area therebetween. The truncated portion has a bleed passageway opening, which is preferably defined at the outer edge of the truncated portion. The bleed passageway opening is in communication with a bleed passage leading through the head portion to a bleed cavity located on an opposite side of the head portion relative to the throat region. In operation, the bleed passageway opening and bleed passage serve to pass gases to the opposite side of the pintle head portion for counterbalancing loads imparted on the truncated substantially conical surface region of the pintle head portion. The thrust control subassembly is operatively coupled to the pintle for moving the pintle axially relative to the throat region and for selectively retaining the pintle at a plurality of axial positions for changing the effective throat area.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention. In the drawings.

DETAILED DESCRIPTION OF THE INVENTION

Figure 1:
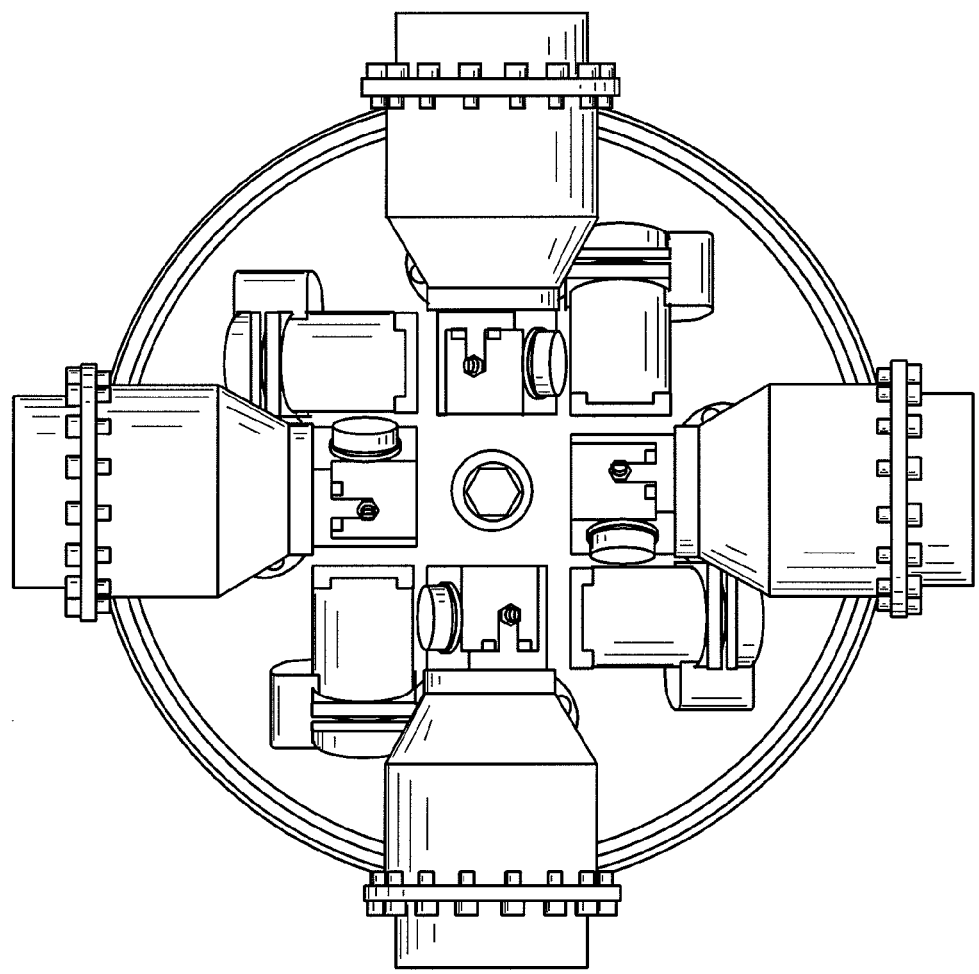
FIG. 1 is a cross-sectional view taken along a rocket motor, showing the relative position of divert thruster assemblies relative to each other and relative to the outer case of the rocket motor.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

Referring now more particularly to the drawings, there is shown in FIG. 1 an exemplary arrangement for a rocket thruster assembly in accordance with an embodiment of this invention. In particular, there is shown four divert thruster assemblies in cruciform arrangement. The divert thruster assemblies are preferably located at the axial center of gravity of the rocket motor, although the divert thruster assemblies may be located elsewhere, such as proximal to the aft end of the rocket assembly. Activation of a selected one or pair of the divert thruster assemblies can, for example, achieve sideways movement of the rocket motor. It should be understood that although not shown, the thruster assemblies of this invention may be used for other purposes, including an axial thrust modulation control (TMC) system and a roll control (RC).

Figure 2:
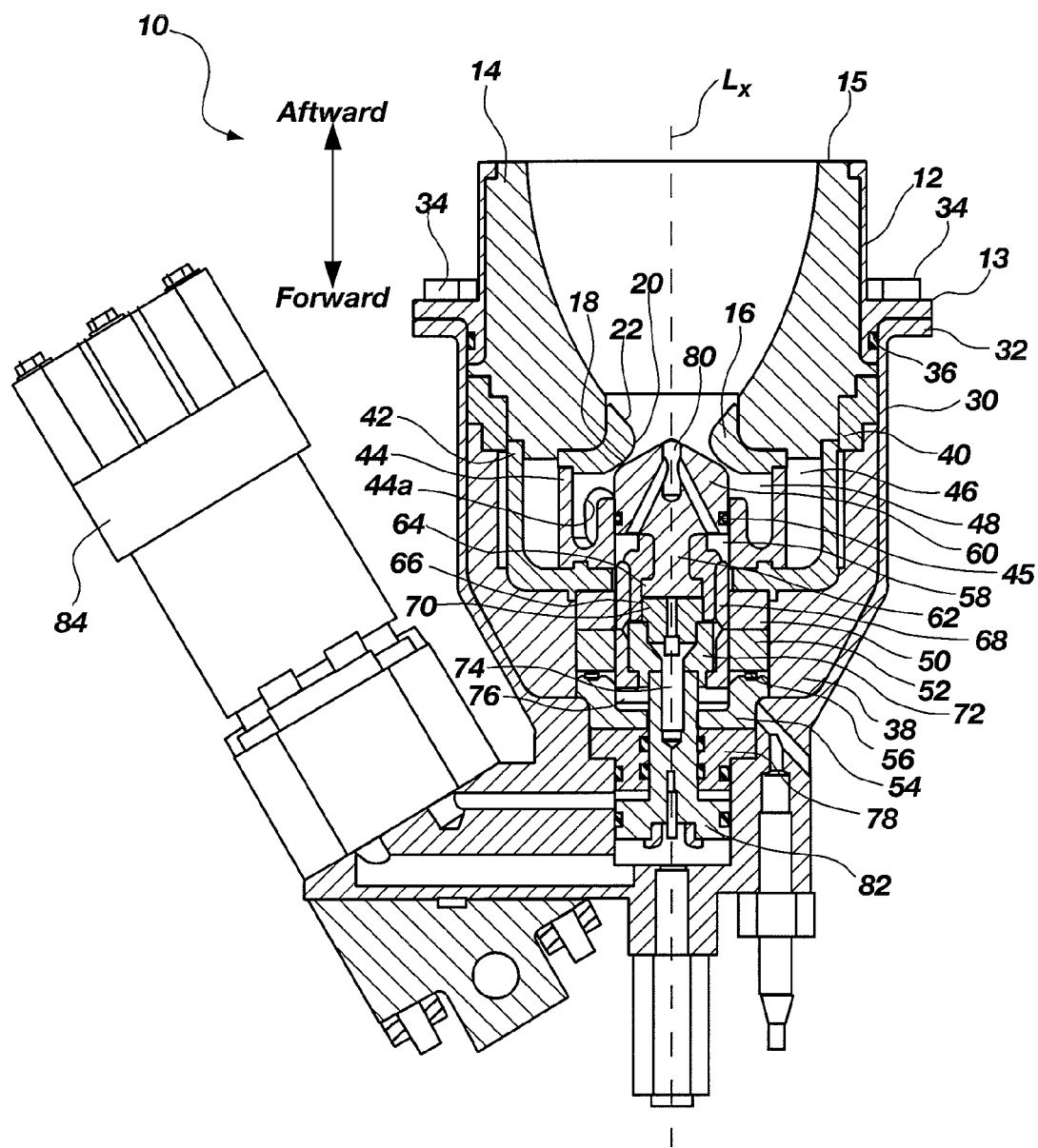
FIG. 2 is a cross-sectional view of one of the divert thruster assemblies of FIG. 1 taken along a diametric sectional line of the divert thruster.
Figure 3:
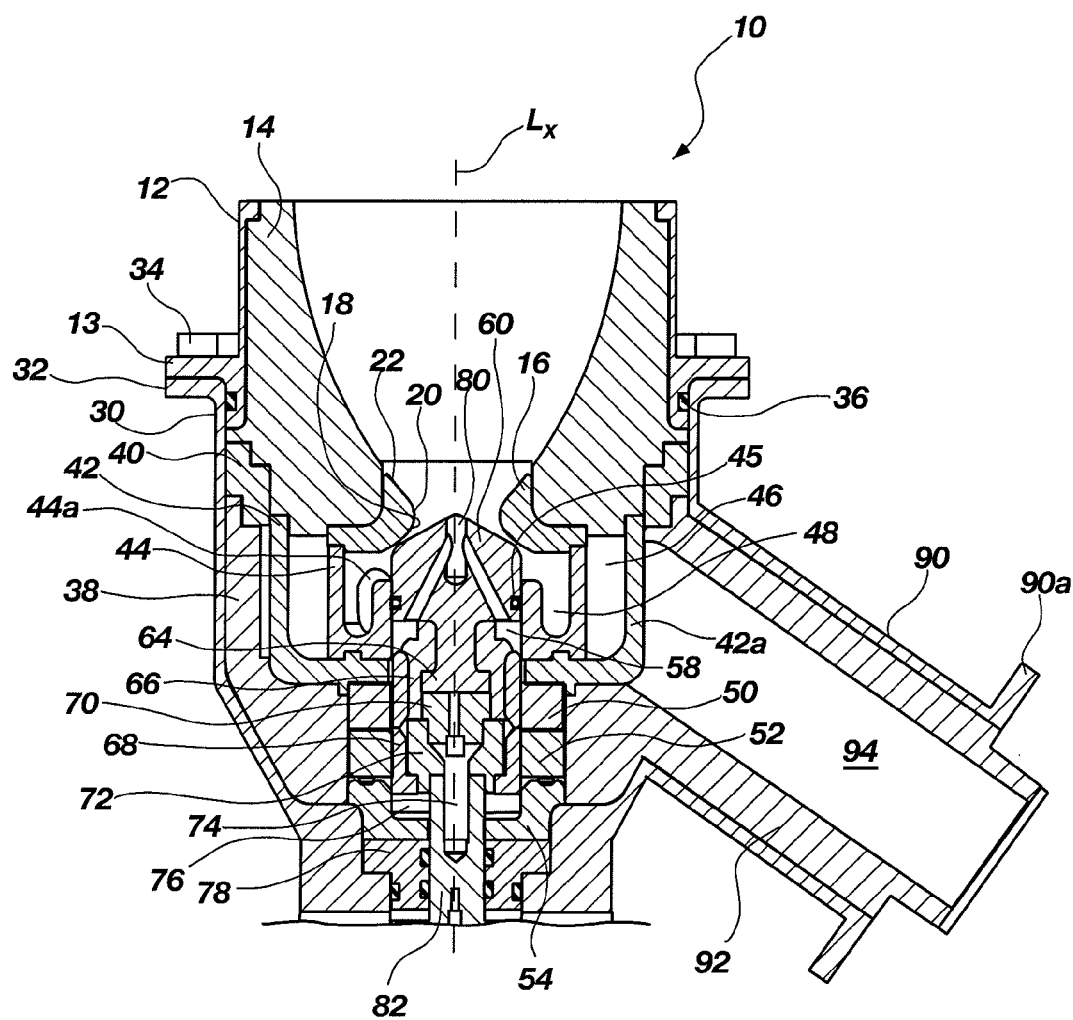
FIG. 3 is a cross-sectional view of one of the divert thruster assemblies of FIG. 1, but taken along a different diametric sectional line from that of FIG. 2.

Referring to FIGS. 2 and 3, a preferred embodiment of a thruster assembly of this invention is generally designated by reference numeral 10. The thruster assembly 10 includes a nozzle comprising a nozzle housing 12 having a nozzle housing flange 13. The nozzle housing 12 may be made of conventional materials such as metal (e.g., steel) or composite material (e.g., cured wound prepreg). Inboard to the nozzle housing 12 is an internal passageway-defining surface structure 14, which is preferably made of an ablative material such as, for example, carbon phenolic or silica phenolic. The internal passageway-defining surface structure 14 may optionally include a throat insert 16. The throat insert 16 may be formed from a refractory material, such as rhenium, tungsten, or alloys containing rhenium and/or tungsten. Refractory ceramics or other alloys, such as molybdenum alloys, may be used. An adhesive, especially epoxies such as EA9394/C2 from Dexter Hysol, may be used for bonding the throat insert 16 to the insulation portion of the internal passageway-defining surface structure 14. The use and preparation of such refractory materials is known in the art. An example of a nozzle throat insert arrangement is described, for example, in WO 01/53683.

The internal passageway-defining surface structure 14 comprises a converging region 18 that converges in cross section into a throat region 20, and a diverging region 22 located aft of the throat region 20 and extending radially outwardly. The converging region 18, throat region 20, and diverging region 22 are coaxially aligned with each other along axis Lx, and together form a converging/diverging pathway. The throat region 20 typically refers to the portion of the converging/diverging pathway having the smallest diameter. The throat region 20 may have a definite axial length or a negligible axial length, such as if the converging region 18 transitions directly into the diverging region 22.

As referred to herein, the term "aftward" means in the general direction toward an aft end 15 of the nozzle. On the other hand, "forward" means in the general direction going away from the aft end 15 of the nozzle toward the pintle valve. Thus, the converging region 18 is located forward of the diverging region 22, and so on. It should be understood, however, that these terms are used herein for matters of convenience and explanation and are not meant to limit the scope of the invention or the permissible orientation of the rocket thruster assemblies 10 on a rocket assembly.

The illustrated rocket thruster assembly 10 includes a valve subassembly having a valve subassembly housing 30 with a valve subassembly housing flange 32. The nozzle housing flange 13 and valve subassembly housing flange 32 each have apertures (not shown) that may be aligned and mated with fasteners, such as bolts or screws, two of which are shown and designated by reference numeral 34. An O-ring seal 36 is provided at the mating interface of the nozzle housing flange 13 and the valve subassembly housing flange 32. The nozzle housing 12 and the valve subassembly housing 30 (and their respective flanges) may comprise a metallic material such as steel, or a composite material, such as wound and cured prepreg.

Figure 5:
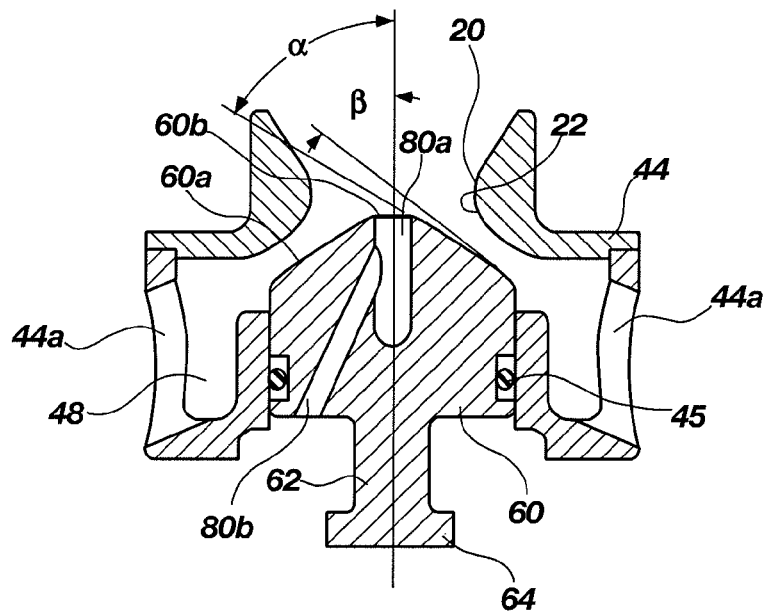
FIG. 5 is a cross-sectional view of the pintle and sleeve support of the valve subassembly of FIG. 4.

Lining the interior surface of the valve assembly housing 30 are annular ablative-resistant insulator 38 and annular seal insulator 40. Each of these insulators 38 and 40 may be comprised of conventional insulation materials, such as carbon phenolics or silica phenolics. An adhesive, such as the aforementioned EA9394/C2, may be used for adhering insulators 38 and 40 to each other. An adhesive such as a silicone adhesive, may be used to adhere the seal insulator 40 to the internal passageway-defining surface structure 14. Seated on the ablative-resistant insulator 38 is an ablative-resistant liner 42, which may comprise a refractory material, such as rhenium, tungsten, and alloys thereof, such as molybdenum alloys. Refractory ceramics and metal alloys, such as molybdenum alloys, may also be used. The liner 42 has a cup shape, with an aperture (unnumbered) concentrically located in its bottom wall. The liner 42 has at least one opening 42a formed in its side wall, as shown in FIG. 3 and discussed in further detail below. Positioned inside and sealed on the liner 42 is an annular sleeve support 44, which likewise may comprise a refractory metal, refractory ceramic, or molybdenum alloy materials. The interface between the bottom walls of the liner 42 and the annular sleeve support 44 may optionally be sealed with, for example, GRAFOIL®, which is made by UCAR Carbon Company. Alternatively, the liner 42 and annular sleeve support 44 may be integrally formed as a unitary piece or may be fused together. The sleeve support 44 also has a general cup shape. As seen in the cross-sectional view of FIGS. 2 and 3, the sleeve support 44 has a radial outer wall that is higher than its radial inner wall, thus giving the sleeve support 44 a J-shaped cross section. An annular outer feed chamber 46 is situated between the side wall of the liner 42 and the radial outer wall of the sleeve support 44. An annular inner feed chamber 48 is situated between the radial outer and inner walls of the sleeve support 44. The sleeve support 44 includes an aperture 44a (or a plurality of apertures 44a, as shown in FIG. 5) for establishing fluid communication between the outer feed chamber 46 and the inner feed chamber 48.

Positioned radially inboard of the insulator 38 are an aft split ring heat sink 50 and a forward split ring heat sink 52. The heat sinks 50 and 52 may comprise, for example, pyrolytic graphite. Although not shown, the heat sinks 50 and 52 each have at least one respective slit extending along their respective radial inner surfaces, with the slits aligned with each other to form a channel. Thus, from an axial view, the heat sinks 50 and 52 would have a "C" shape if only one slit is present. The slits extend substantially axially from the aft end of heat sink 50 to the forward end of heat sink 52 to provide a secondary bleed passageway. The heat sinks 50 and 52 are seated on a valve closure insulator 54, with an expansion ring 56 situated between the valve closure insulator 54 and the forward split ring heat sink 52. The expansion ring 56 may comprise GRAFOIL®. The valve closure insulator 54 is preferably made of silica phenolic, although other materials, such as carbon phenolic, may be used.

Figure 4:
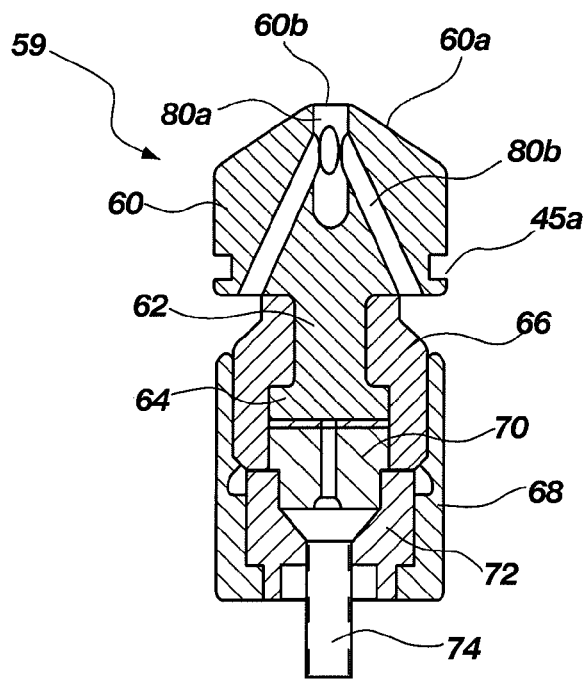
FIG. 4 is an enlarged cross-sectional, isolated view of the valve subassembly of the divert thruster assemblies of FIGS. 1-3.

The pintle valve is shown in greater detail in FIG. 4, in which the pintle valve is generally designated by reference numeral 59. The pintle valve 59 includes a pintle head portion 60 slidably received by a radial inner surface of the sleeve support 44 and the central aperture of the ablative-resistant liner 42. A piston or split ring 45 (FIGS. 2 and 3) received in a channel 45a of the pintle head portion 60 serves to seal the interface between the pintle head portion 60 and the sleeve support 44, thus preventing (or at least substantially obstructing) the flow of gases past the piston ring 45. The piston ring 45 may be made of, for example, ceramic, refractory metal, or graphite. The pintle head portion 60 has a truncated substantially conical surface region 60a (FIG. 4) terminating at an aft end as a blunt truncated portion 60b coaxially aligned with the throat region 20. The truncated conical surface region 60a faces and is concentric with the converging region 18 and the throat region 20 to provide a variable effective throat area therebetween. In one preferred embodiment shown in FIG. 5, the truncated substantially conical surface region 60a has a bi-angular profile, with angles $\alpha$ and $\beta$ preferably measuring 60° and 52.5°, respectively. The truncated substantially conical surface region 60a may have other sectional profiles. For example, the substantially conical surface region 60a may be linear, curvilinear, or have a multi-angular profile of three or more angles. Preferably, the substantially conical surface region 60a is continuous (non-interrupted) from its outer edge to its truncated portion 60b.

Also at the forward end surface of the pintle head portion 60 is a stem portion 62, which has a smaller outer diameter than the maximum outer diameter of the pintle head portion 60. A pintle base portion 64 is located forward of the pintle stem portion 62, and has an outer diameter that is larger than the outer diameter of the pintle stem portion 62, but smaller than the outer diameter of the pintle head portion 60. In a preferred but not limiting feature of the invention, the pintle head portion 60, the pintle stem portion 62, and the pintle base portion 64 are integral, meaning they are a unitary piece. In a preferred embodiment, the pintle head portion 60, pintle stem portion 62, and pintle base portion 64 comprise, and more preferably consist essentially of, a refractory metal or refractory metal alloy. Refractory metals include tungsten and rhenium. Refractory ceramics and metal alloys, such as molybdenum alloys, may also be used.

A base insulator 70 is positioned forward of the pintle base portion 64. An adhesive, such as an epoxy adhesive, may be used to couple the base insulator 70 and the pintle base portion 64. The base insulator 70 is shown with an axial adhesive bleed hole, which is optional and may be filled with an adhesive, such as an epoxy. The base insulator 70 may comprise a quartz or silica phenolic cylinder, by way of example. The base insulator 70 rests on a connector 74, such as a screw or a bolt. The connector 74 preferably comprises, and more preferably consists essentially of, a metal, such as steel.

A pintle retainer 66 and an actuation sleeve insulator 72 are arranged axially relative to each other, and function as a sleeve to collectively surround the pintle stem and base portions 62 and 64, the base insulator 70, and a portion of the connector 74. The pintle retainer 66 may have an axial split for facilitating placement around the pintle stem and base portions 62 and 64. The pintle retainer 66 also preferably has a threaded exterior surface portion for mating with threads on the internal surface portion of a cylindrical retention sleeve 68, which is discussed in further detail below. In a preferred embodiment, the pintle retainer 66 is made of a combination of NOVELTEX™ and silicon carbide (SiC). The actuation sleeve insulator 72 may comprise, for example, a quartz phenolic or silica phenolic.

The cylindrical retention sleeve 68 surrounds outer surface regions of the pintle retainer 66 and the actuation sleeve insulator 72. The cylindrical retention sleeve 68 preferably comprises, and more preferably consists essentially of, a refractory ceramic, a refractory metal or alloy, such as tungsten, rhenium, and alloys containing tungsten, rhenium, and/or molybdenum.

As shown in FIGS. 4 and 5, in an especially preferred embodiment the truncated portion 60b has an outer edge defining a bleed passageway opening in communication with a bleed passageway 80 leading through the pintle head portion 60. Thus, in this preferred embodiment the edge of the bleed passageway opening meets the proximal extent of the substantially conical surface region 60a. It is possible, although less preferred and not shown, for the truncated portion 60b to include a small surface annulus extending between the edge of the truncated portion 60b and the bleed passageway opening. The bleed passageway 80 comprises a central entrance bore 80a and a plurality of radial bleed passageways 80b. The central entrance bore 80a extends from the bleed passageway opening of the truncated portion 60b and terminates in the pintle head portion 60. The central entrance bore 80a preferably has a tube-like shape with a rounded bottom. In the illustrated embodiment, the bleed passageway 80 includes four radial bleed passageways 80b, although fewer or more may be present. The radial bleed passageways 80b each have a respective first end intersecting the central entrance bore 80a and a respective second end terminating at the forward surface of the pintle head portion 60. The second ends of the radial bleed passageways 80b are preferably uniformly spaced circumferentially from each other.

A primary bleed cavity is designated by reference numeral 58 in FIGS. 1 and 2. As described in greater detail below, the bleed cavity 58 is adjacent an opposite side of the pintle head portion 60 relative to the throat region 20 for counterbalancing the load imparted on the face of the pintle valve 59 by combustion gases. More particularly, in the illustrated embodiment, the primary bleed cavity 58 is defined at its aft end by the forward face of the pintle head portion 60. In this manner, the primary bleed cavity 58 is placed in fluid communication with the bleed passageway 80. A radial outer wall of the primary bleed cavity 58 is provided by the sleeve support 44 and, depending upon the axial position of the pintle valve 59, the ablative-resistant liner 42. The pintle retainer 66 defines a radial inner wall of the primary bleed cavity 58.

The thruster assembly 10 is also provided with a thrust control subassembly operatively coupled to the pintle valve 59. The thruster control subassembly moves the pintle valve 59 axially relative to the throat region 20 for moving the pintle valve 59 to and selectively retaining the pintle valve 59 at a plurality of axial positions for variably changing the effective throat area. The thrust control subassembly comprises a piston shaft 82 that is operatively coupled to the pintle valve 59. The piston shaft 82 is preferably coated with zirconia. The piston shaft 82 is slidably received by an end cap 78, which includes several channels receiving O-ring seals (unnumbered), including two O-ring seals at the interface of the piston shaft 82 and the end cap 78. An actuator 84, such as a hydraulic, pneumatic, or electric-driven actuator, moves the piston shaft 82 to in turn move the pintle valve 59 axially. The design of the actuator 84 is not elaborated upon in further detail herein, since many types of actuators of various known designs may be used to effect the axial movement of the piston shaft 82.

The actuator 84 moves the pintle valve 59 components (parts 60, 62, 64, 66, 70, 72, and 74) in unison in an axial direction. In accordance with one preferred embodiment, the thrust control subassembly is operatively coupled to the pintle valve 59 for moving the pintle valve 59 axially relative to the throat region 20 between a plurality of open positions and a closed position. In the open positions, the pintle head portion 60 is spaced from the converging region 18 and the throat region 20 to define an effective throat area. It is especially preferred that the pintle valve 59 placement be continuously variable, meaning that the pintle head portion 60 may be moved into and retained at any position between a maximum open position and the closed position. In the closed position, the pintle head portion 60 contacts the internal passageway-defining surface structure 14 and, more particularly, the nozzle insert 16, to close the nozzle passageway.

In accordance with another preferred embodiment, the pintle valve 59 remains in an open position at all times, and is not movable into the fully closed position. In this embodiment, the pintle valve 59 is preferably movable into a plurality of open positions, more preferably at least three different open positions for establishing three different effective throat areas.

Movement of the pintle valve 59 in an aft direction toward the throat region 20 establishes a secondary bleed cavity 76. The secondary bleed passageway, which is defined by the slits of heat sinks 50 and heat sink 52 and the radial outer surface of retention sleeve 68, connects the secondary bleed cavity 76 to the primary bleed cavity 58. As mentioned above, the primary bleed cavity 58 (and hence the secondary bleed cavity 76) communicates with the nozzle passageway via primary bleed passageway 80. Thus, as the pintle valve 59 is moved back and forth by actuation of the piston shaft 82, the secondary bleed cavity 76 changes in volume and is allowed to pressurize and depressurize by aspirating and expelling gas through the primary and secondary bleed passageways.

As shown in FIG. 3, the thruster assembly 10 includes a supply tube housing 90 having a flange portion 90a. Supply tube insulation 92 located inward of the housing 90 has an inner surface defining a supply tube passage 94. The supply tube housing 90 is coupled to a gas generator (not shown) capable of generating combustion products, which comprise gases usually having particles entrained therein.

The operation of the rocket thruster 10 will now be explained in detail. Upon combustion of the gas generant or propellant in the gas generator, combustion products are fed through the supply tube passage 94 through radial opening 42a of the ablative-resistant liner 42. The combustion products fill the annular outer feed chamber 46, then pass through the radial opening or openings 44a of the sleeve support 44 into the annular inner feed chamber 48.

When the pintle valve 59 is closed, combustion products are prevented from flowing through the converging region 18 and/or the throat region 20. Thus, the thruster assembly 10 is inactive and does not contribute to the overall thrust or maneuverability of the rocket motor.

When the pintle valve 59 is in one of its open positions, the combustion products flow from the annular inner feed chamber and pass through an effective throat area between, on the one hand, the substantially conical surface region 60a of the pintle head portion 60 and, on the other hand, the converging and throat regions 18 and 20. The effective throat area may be adjusted by axial movement of the pintle valve 59, which causes the substantially conical surface region 60a to move toward or away from the converging and throat regions 18 and 20. The combustion products then pass through the throat region 20, and expand rapidly as the combustion products pass through diverging region 22 for generating propulsive thrust.

Figure 6:
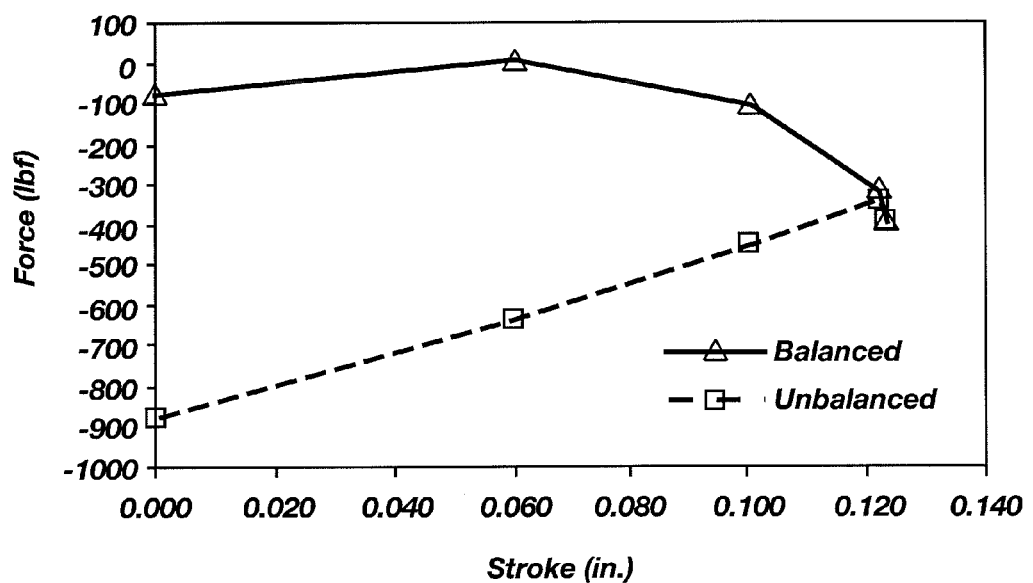
FIG. 6 is a graph illustrating the amount of load (pound) force ($lb_f$) predicted to operate a pintle for a divert thruster assembly according to the present invention (solid line and triangular data points) and a conventional divert thruster assembly (dashed line with square data points).

The flow of combustion products over the pintle head portion 60 imparts a high load on the pintle valve 59. For example, as shown in FIG. 6, a rocket thruster containing a conventional pintle valve may be subjected to a force of about 900 $lb_f$ when in a fully open position. Although the force imparted on the conventional pintle valve is reduced as the pintle head portion is moved toward its closed position, high forces of about 650 $lb_f$ and about 400 $lb_f$ were still predicted for pintle positions of 0.060 inch and 0.100 inch (from the fully open position), respectively.

In contrast to the conventional design, in accordance with the principles of this invention, a portion of the combustion gas passing over the substantially conical surface region 60a enters into the bleed passageway opening of the truncated portion 60b. The combustion gases pass through the primary bleed passageway 80, and apply a counterbalancing load to the forward end of the pintle head portion 60. Without being bound by any theory, it is presently believed that the position of the bleed passageway opening at the outer edge of the truncated portion produces optimal pressure with which to bleed off gas to the primary bleed cavity 58 behind the valve 59 for optimal balancing of the pintle loads. This optimal pressure is typically caused by a shock wave that forms upstream of the bleed passage opening. In this manner, the load on the substantially conical surface region 60a is partially or completely balanced by the load transferred through the primary bleed passageway 80 to the opposite end of the pintle head portion 60. The effectiveness of this load balance is illustrated in FIG. 6. For a fully open position, the pressure load predicted at the substantially conical surface region 60a was only about 100 $lb_f$, compared to about 900 $lb_f$ for the conventional pintle design. When the pintle valve 59 was moved by 0.060 inch from the fully open position, the force predicted at the substantially conical surface region 60a was close to 0 $lb_f$, compared to about 650 $lb_f$ for the conventional pintle valve. At 0.10 inch from the fully open position, the predicted force at the substantially conical surface region 60a was about 100 $lb_f$, compared to about 400 $lb_f$ for the conventional pintle valve. The remarkable decreases in loads predicted at the face of the pintle valve 59 were attributable to load balancing. As a consequence, less horsepower is required from the thrust control subassembly to move the pintle valve. Hence, the rocket thruster 10 may operate with smaller and lighter thrust control subassemblies than conventional rocket thrusters.

In a particularly preferred embodiment of this invention, the component parts of the pintle valve 59 are made of materials designed to channel heat away from the pintle head portion 60 and ensure tight seals between the component parts. In particular, metals, especially refractory metals such as rhenium expand when heated to the elevated temperatures experienced during rocket motor firing. This expansion causes the components formed of metals to establish a compression seal against adjacent insulation components, which undergo less or no appreciable thermal expansion. For example, in one preferred embodiment the pintle head portion 60, stem portion 62, base portion 64, retention sleeve 68, and connector 74 are made of a metal or metals such as rhenium or a rhenium alloy. The pintle retainer 66 and the actuation sleeve insulator 72 interposed between the refractory metal components are made of insulation materials that undergo less thermal expansion than the refractory metals. Hence, as the pintle valve 59 is heated, the interface between the stem portion 62 and the pintle retainer 66 is compression sealed by expansion of the stem portion 62. Likewise, the interface between the retention sleeve 68 and both of the pintle retainer 66 and actuation sleeve insulator 72 is sealed by expansion of the retention sleeve 68. Additionally, in this particularly preferred embodiment the base insulator 70 and the split rings 50 and 52 function as heat sinks, with the refractory metal components channeling heat away from the pintle head portion 60 to the heat sinks 50, 52, and 70.

The foregoing detailed description of the preferred embodiments of the invention has been provided for the purposes of illustration and description, and is not intended to be exhaustive or to limit the invention to the precise embodiments disclosed. The embodiments were chosen and described in order to best explain the principles of the invention and its practical application, thereby enabling others skilled in the art to understand the invention for various embodiments and with various modifications as are suited to the particular use contemplated. It is intended that the scope of the invention cover various modifications and equivalents included within the spirit and scope of the appended claims.

What is claimed is:

1. A rocket thruster assembly comprising:
    a nozzle providing an internal passageway-defining surface structure for receiving and expelling combustion products, the internal passageway-defining structure comprising a converging region that converges in cross section into a throat region, and a diverging region located aft of the throat region and extending radially outwardly;

a valve subassembly comprising a pintle with a head portion, the head portion having a truncated substantially conical surface region terminating at an aft truncated portion coaxial with the throat region, the truncated substantially conical surface region facing the converging region and the throat region to provide a variable effective throat area therebetween, the truncated portion having a bleed passageway opening in communication with a passage leading through the head portion to a bleed cavity located on an opposite side of the head portion relative to the throat region for receiving and expelling the combustion products to counterbalance the pintle; and a thrust control subassembly operatively coupled to the pintle for moving the pintle axially back and forth relative to the throat region to a plurality of axial positions and for selectively retaining the pintle at the plurality of axial positions for changing the effective throat area;

wherein the thrust control subassembly further comprises an actuator operatively coupled to the pintle for moving the pintle axially back and forth relative to the throat region and retaining the pintle at a plurality of open positions in which the pintle is spaced from the converging region and the throat region, and at a closed position in which the pintle contacts the internal passageway-defining surface structure to close at least one of the throat region and the converging region.

2. A rocket thruster assembly according to claim 1, wherein the internal passageway-defining surface structure comprises an insert structure.

3. A rocket thruster assembly according to claim 1, wherein the internal passageway-defining surface structure comprises an insert structure defining the converging region and the throat region, the insert structure comprising at least one refractory material selected from the group consisting of rhenium, tungsten, rhenium alloys, and tungsten alloys.

4. A rocket thruster assembly according to claim 1, wherein the converging and diverging regions and the throat region are coaxially aligned with each other.

5. A rocket thruster assembly according to claim 1, wherein the truncated portion has an outer edge defining the bleed passageway opening.

6. A rocket thruster assembly according to claim 1, wherein the pintle further comprises a stem portion integral with the head portion, the stem portion being surrounded by the bleed cavity.

7. A rocket thruster assembly according to claim 1, wherein the head portion comprises a refractory material comprising at least one material selected from the group consisting of rhenium, tungsten, a rhenium alloy, and a tungsten alloy.

8. A rocket thruster assembly according to claim 1, wherein the truncated substantially conical surface region has a bi-angular cross section.

9. A rocket thruster assembly according to claim 1, wherein the truncated substantially conical surface region is concentric with the throat region and the converging region.

10. A rocket thruster assembly comprising:

a nozzle providing an internal passageway-defining surface structure for receiving and expelling combustion products, the internal passageway-defining structure comprising a converging region that converges in cross section into a throat region, and a diverging region located aft of the throat region and extending radially outwardly;

a valve subassembly comprising a pintle with a head portion, the head portion having a truncated substantially conical surface region terminating at an aft truncated portion coaxial with the throat region, the truncated substantially conical surface region facing the converging region and the throat region to provide a variable effective throat area therebetween, the truncated portion having a bleed passageway opening in communication with a passage leading through the head portion to a bleed cavity located on an opposite side of the head portion relative to the throat region for receiving and expelling the combustion products to counterbalance the pintle; and a thrust control subassembly operatively coupled to the pintle for moving the pintle axially back and forth relative to the throat region to a plurality of axial positions and for selectively retaining the pintle at the plurality of axial positions for changing the effective throat area;

wherein the thrust control subassembly further comprises an actuator operatively coupled to the pintle for moving the pintle axially back and forth relative to the throat region and retaining the pintle at a plurality of open positions in which the pintle is spaced from the converging region and the throat region, the effective throat area being different for each of the open positions.

11. A rocket thruster assembly according to claim 10, wherein the internal passageway-defining surface structure comprises an insert structure.

12. A rocket thruster assembly according to claim 10, wherein the internal passageway-defining surface structure comprises an insert structure defining the converging region and the throat region, the insert structure comprising at least one refractory material selected from the group consisting of rhenium, tungsten, rhenium alloys, and tungsten alloys.

13. A rocket thruster assembly according to claim 10, wherein the converging and diverging regions and the throat region are coaxially aligned with each other.

14. A rocket thruster assembly according to claim 10, wherein the truncated portion has an outer edge defining the bleed passageway opening.

15. A rocket thruster assembly according to claim 10, wherein the pintle further comprises a stem portion integral with the head portion, the stem portion being surrounded by the bleed cavity.

16. A rocket thruster assembly according to claim 10, wherein the head portion comprises a refractory material comprising at least one material selected from the group consisting of rhenium, tungsten, a rhenium alloy, and a tungsten alloy.

17. A rocket thruster assembly according to claim 10, wherein the truncated substantially conical surface region has a bi-angular cross section.

18. A rocket thruster assembly according to claim 10, wherein the truncated substantially conical surface region is concentric with the throat region and the converging region.

19. A rocket thruster assembly comprising:

a nozzle providing an internal passageway-defining surface structure for receiving and expelling combustion products, the internal passageway-defining structure comprising a converging region that converges in cross section into a throat region, and a diverging region located aft of the throat region and extending radially outwardly;

a valve subassembly comprising a pintle with a head portion, the head portion having a truncated substantially conical surface region terminating at an aft truncated portion coaxial with the throat region, the truncated substantially conical surface region facing the converging region and the throat region to provide a variable effective throat area therebetween, the truncated portion having a bleed passageway opening in communication with a passage leading through the head portion to a bleed cavity located on an opposite side of the head portion relative to the throat region for receiving and expelling the combustion products to counterbalance the pintle; and a thrust control subassembly operatively coupled to the pintle for moving the pintle axially back and forth relative to the throat region to a plurality of axial positions and for selectively retaining the pintle at the plurality of axial positions for changing the effective throat area;

wherein the thrust control subassembly is continuously variable, the thrust control subassembly comprises an actuator operatively coupled to the pintle for moving the pintle axially relative to the throat region and retaining the pintle at any position between a maximum open position and a closed position.

20. A rocket thruster assembly according to claim 19, wherein the internal passageway-defining surface structure comprises an insert structure.

21. A rocket thruster assembly according to claim 19, wherein the internal passageway-defining surface structure comprises an insert structure defining the converging region and the throat region, the insert structure comprising at least one refractory material selected from the group consisting of rhenium, tungsten, rhenium alloys, and tungsten alloys.

22. A rocket thruster assembly according to claim 19, wherein the converging and diverging regions and the throat region are coaxially aligned with each other.

23. A rocket thruster assembly according to claim 19, wherein the truncated portion has an outer edge defining the bleed passageway opening.

24. A rocket thruster assembly according to claim 19, wherein the pintle further comprises a stem portion integral with the head portion, the stem portion being surrounded by the bleed cavity.

25. A rocket thruster assembly according to claim 19, wherein the head portion comprises a refractory material comprising at least one material selected from the group consisting of rhenium, tungsten, a rhenium alloy, and a tungsten alloy.

26. A rocket thruster assembly according to claim 19, wherein the truncated substantially conical surface region has a bi-angular cross section.

27. A rocket thruster assembly according to claim 19, wherein the truncated substantially conical surface region is concentric with the throat region and the converging region.

28. A rocket thruster assembly comprising:

a nozzle providing an internal passageway-defining surface structure for receiving and expelling combustion products, the internal passageway-defining structure comprising a converging region that converges in cross section into a throat region, and a diverging region located aft of the throat region and extending radially outwardly;

a valve subassembly comprising a pintle with a head portion, the head portion having a truncated substantially conical surface region terminating at an aft truncated portion coaxial with the throat region, the truncated substantially conical surface region facing the converging region and the throat region to provide a variable effective throat area therebetween, the truncated portion having a bleed passageway opening in communication with a passage leading through the head portion to a bleed cavity located on an opposite side of the head portion relative to the throat region for receiving and expelling the combustion products to counterbalance the pintle; and a thrust control subassembly operatively coupled to the pintle for moving the pintle axially back and forth relative to the throat region to a plurality of axial positions and for selectively retaining the pintle at the plurality of axial positions for changing the effective throat area;

wherein the passage comprises a central entrance bore and a plurality of radial bleed passageways, the central entrance bore extending from the bleed passageway opening and terminating in the pintle, the radial bleed passageways each having a respective first end intersecting the central entrance bore and a respective second end terminating at the bleed cavity, the second ends of the radial bleed passageways being spaced circumferentially from each other.

29. A rocket thruster assembly according to claim 28, wherein the internal passageway-defining surface structure comprises an insert structure.

30. A rocket thruster assembly according to claim 28, wherein the internal passageway-defining surface structure comprises an insert structure defining the converging region and the throat region, the insert structure comprising at least one refractory material selected from the group consisting of rhenium, tungsten, rhenium alloys, and tungsten alloys.

31. A rocket thruster assembly according to claim 28, wherein the converging and diverging regions and the throat region are coaxially aligned with each other.

32. A rocket thruster assembly according to claim 28, wherein the truncated portion has an outer edge defining the bleed passageway opening.

33. A rocket thruster assembly according to claim 28, wherein the pintle further comprises a stem portion integral with the head portion, the stem portion being surrounded by the bleed cavity.

34. A rocket thruster assembly according to claim 28, wherein the head portion comprises a refractory material comprising at least one material selected from the group consisting of rhenium, tungsten, a rhenium alloy, and a tungsten alloy.

35. A rocket thruster assembly according to claim 28, wherein the truncated substantially conical surface region has a bi-angular cross section.

36. A rocket thruster assembly according to claim 28, wherein the truncated substantially conical surface region is concentric with the throat region and the converging region.

37. A rocket thruster assembly comprising:

a nozzle providing an internal passageway-defining surface structure for receiving and expelling combustion products, the internal passageway-defining structure comprising a converging region that converges in cross section into a throat region, and a diverging region located aft of the throat region and extending radially outwardly;

a valve subassembly comprising a pintle with a head portion, the head portion having a truncated substantially conical surface region terminating at an aft truncated portion coaxial with the throat region, the truncated substantially conical surface region facing the converging region and the throat region to provide a variable effective throat area therebetween, the truncated portion having a bleed passageway opening in communication with a passage leading through the head portion to a bleed cavity located on an opposite side of the head portion relative to the throat region for receiving and expelling the combustion products to counterbalance the pintle; and a thrust control subassembly operatively coupled to the pintle for moving the pintle axially back and forth relative to the throat region to a plurality of axial positions and for selectively retaining the pintle at the plurality of axial positions for changing the effective throat area, wherein:

the pintle further comprises a retention sleeve movable axially in unison with the pintle head, the retention sleeve having an outer surface region;

the valve subassembly further comprises at least one split ring insulator surrounding the retention sleeve, the split ring insulator having at least one slit that faces the outer surface region of the retention sleeve to define a secondary bleed passageway;

the thrust control subassembly comprises a piston for axially sliding the pintle relative to the split ring insulator to move the pintle head portion toward and away from the throat region, movement of the pintle head toward the throat region establishing a secondary cavity at an area from which the piston was moved; and the secondary bleed passageway connects the bleed cavity to the secondary cavity.

38. A rocket thruster assembly according to claim 37, wherein the internal passageway-defining surface structure comprises an insert structure.

39. A rocket thruster assembly according to claim 37, wherein the internal passageway-defining surface structure comprises an insert structure defining the converging region and the throat region, the insert structure comprising at least one refractory material selected from the group consisting of rhenium, tungsten, rhenium alloys, and tungsten alloys.

40. A rocket thruster assembly according to claim 37, wherein the converging and diverging regions and the throat region are coaxially aligned with each other.

41. A rocket thruster assembly according to claim 37, wherein the truncated portion has an outer edge defining the bleed passageway opening.

42. A rocket thruster assembly according to claim 37, wherein the pintle further comprises a stem portion integral with the head portion, the stem portion being surrounded by the bleed cavity.

43. A rocket thruster assembly according to claim 37, wherein the head portion comprises a refractory material comprising at least one material selected from the group consisting of rhenium, tungsten, a rhenium alloy, and a tungsten alloy.

44. A rocket thruster assembly according to claim 37, wherein the truncated substantially conical surface region has a bi-angular cross section.

45. A rocket thruster assembly according to claim 37, wherein the truncated substantially conical surface region is concentric with the throat region and the converging region.

46. A rocket thruster assembly comprising:

a nozzle providing an internal passageway-defining surface structure for receiving and expelling combustion products, the internal passageway-defining structure comprising a converging region that converges in cross section into a throat region, and a diverging region located aft of the throat region and extending radially outwardly;

a valve subassembly comprising a pintle with a head portion, the head portion having a truncated substantially conical surface region terminating at an aft truncated portion coaxial with the throat region, the truncated substantially conical surface region facing the converging region and the throat region to provide a variable effective throat area therebetween, the truncated portion having a bleed passageway opening in communication with a passage leading through the head portion to a bleed cavity located on an opposite side of the head portion relative to the throat region for receiving and expelling the combustion products to counterbalance the pintle; and a thrust control subassembly operatively coupled to the pintle for moving the pintle axially back and forth relative to the throat region to a plurality of axial positions and for selectively retaining the pintle at the plurality of axial positions for changing the effective throat area, wherein:

the pintle further comprises a stem portion integral with the head portion, the stem portion having an outer surface region, the head portion and the stem portion each comprising a refractory material comprising at least one refractory metal; and the valve subassembly further comprises:

a pintle retainer surrounding the stem portion and adjacent the outer surface region of the stem portion, the pintle retainer having an outer surface region and comprising an insulation material;

a pintle retention sleeve surrounding the pintle retainer and adjacent the outer surface portion surrounding the pintle retainer, the pintle retention sleeve comprising at least one refractory metal; and at least one ring insulator surrounding the pintle retention sleeve, the ring insulator comprising a material suitable for use as a heat sink.

47. A rocket thruster assembly according to claim 46, wherein the refractory metal comprises at least one member selected from the group consisting of rhenium, tungsten, a rhenium alloy, and a tungsten alloy.

48. A rocket thruster assembly according to claim 46, wherein the internal passageway-defining surface structure comprises an insert structure.

49. A rocket thruster assembly according to claim 46, wherein the internal passageway-defining surface structure comprises an insert structure defining the converging region and the throat region, the insert structure comprising at least one refractory material selected from the group consisting of rhenium, tungsten, rhenium alloys, and tungsten alloys.

50. A rocket thruster assembly according to claim 46, wherein the converging and diverging regions and the throat region are coaxially aligned with each other.

51. A rocket thruster assembly according to claim 46, wherein the truncated portion has an outer edge defining the bleed passageway opening.

52. A rocket thruster assembly according to claim 46, wherein the pintle further comprises a stem portion integral with the head portion, the stem portion being surrounded by the bleed cavity.

53. A rocket thruster assembly according to claim 46, wherein the head portion comprises a refractory material comprising at least one material selected from the group consisting of rhenium, tungsten, a rhenium alloy, and a tungsten alloy.

54. A rocket thruster assembly according to claim 46, wherein the truncated substantially conical surface region has a bi-angular cross section.

55. A rocket thruster assembly according to claim 46, wherein the truncated substantially conical surface region is concentric with the throat region and the converging region.

* * * * *

UNITED STATES PATENT AND TRADEMARK OFFICE
CERTIFICATE OF CORRECTION

PATENT NO.         : 7,849,695 B1  
APPLICATION NO.    : 09/954128  
DATED              : December 14, 2010  
INVENTOR(S)        : Cary L. Cover and Albert S. Drendel Page 1 of 1

It is certified that error appears in the above-identified patent and that said Letters Patent is hereby corrected as shown below:

On the title page:
In ITEM (56) References Cited
   OTHER PUBLICATIONS
   Page 2, $2^{nd}$ column, $1^{st}$ line of the
     $4^{th}$ entry (line 14),              change "Printle" to --Pintle--
   Page 2, $2^{nd}$ column, $3^{rd}$ line of the
     $7^{th}$ entry (line 26),              change "2004/Feb/Ajustable_Rocket.htm," to
                                    --2004/Feb/Adjustable_Rocket.htm,--

In the specification:
    COLUMN 1,   LINE 61,      change "insure" to --ensure--
    COLUMN 8,   LINE 65,      change "sinks 50" to --sink 50--

Signed and Sealed this
Thirteenth Day of September, 2011

David J. Kappos
*Director of the United States Patent and Trademark Office*

UNITED STATES PATENT AND TRADEMARK OFFICE
CERTIFICATE OF CORRECTION

PATENT NO. : 7,849,695 B1
APPLICATION NO. : 09/954126
DATED : December 14, 2010
INVENTOR(S) : Cary L. Cover and Albert S. Drendel It is certified that error appears in the above-identified patent and that said Letters Patent is hereby corrected as shown below:

On the title page:
In ITEM (56) References Cited
OTHER PUBLICATIONS
Page 2, 2nd column, 1st line of the
4th entry (line 14), change "Printle" to --Pintle--
Page 2, 2nd column, 3rd line of the
7th entry (line 26), change "2004/Feb/Ajustable_Rocket.htm," to --2004/Feb/Adjustable_Rocket.htm,--

In the specification:
COLUMN 1, LINE 61, change "insure" to --ensure--
COLUMN 8, LINE 65, change "sinks 50" to --sink 50--

This certificate supersedes the Certificate of Correction issued September 13, 2011.

Signed and Sealed this
Twenty-eighth Day of June, 2016

Michelle K. Lee
*Director of the United States Patent and Trademark Office*